US012080844B2

(12) United States Patent
Mayer et al.

(10) Patent No.: US 12,080,844 B2
(45) Date of Patent: Sep. 3, 2024

(54) MODULE HOUSING FOR A STACKABLE BATTERY MODULE, BATTERY MODULE, AND BATTERY STACK

(71) Applicant: LION Smart GmbH, Garching (DE)

(72) Inventors: Tobias Mayer, Munich (DE); Christian Behlen, Munich (DE)

(73) Assignee: LION SMART GmbH, Garching (DE)

( * ) Notice: Subject to any disclaimer, the term of this patent is extended or adjusted under 35 U.S.C. 154(b) by 1151 days.

(21) Appl. No.: 16/762,740

(22) PCT Filed: Nov. 8, 2018

(86) PCT No.: PCT/EP2018/080552
§ 371 (c)(1),
(2) Date: Oct. 7, 2020

(87) PCT Pub. No.: WO2019/092070
PCT Pub. Date: May 16, 2019

(65) Prior Publication Data
US 2021/0028420 A1    Jan. 28, 2021

(30) Foreign Application Priority Data
Nov. 9, 2017 (DE) .................. 10 2017 219 934.2

(51) Int. Cl.
*H01M 10/0525* (2010.01)
*H01M 50/20* (2021.01)
(Continued)

(52) U.S. Cl.
CPC ..... *H01M 10/0525* (2013.01); *H01M 50/213* (2021.01); *H01M 50/514* (2021.01); *H01M 2220/20* (2013.01)

(58) Field of Classification Search
None
See application file for complete search history.

(56) References Cited

U.S. PATENT DOCUMENTS

2005/0070164 A1* 3/2005 Mita ................. H01M 50/503
439/627
2008/0248383 A1* 10/2008 Kim ................. H01M 10/0587
429/156
(Continued)

FOREIGN PATENT DOCUMENTS

CN    102447081 A    5/2012
CN    102447086 A    5/2012
(Continued)

OTHER PUBLICATIONS

German Office Action from corresponding German Patent Application No. 10 2017 219 934.2 dated Jul. 6, 2021, 6 pages.
(Continued)

*Primary Examiner* — Lisa S Park
(74) *Attorney, Agent, or Firm* — Ruggiero McAllister & McMahon LLC

(57) ABSTRACT

The invention relates to a module housing for a stackable battery module, with a plurality of battery modules that can be stacked in a stacking direction to form a battery stack, and the module housing includes a base section and a holding space for the accommodation of battery units of the battery module. The invention further relates to a battery module for a battery stack, including a module housing. The invention also relates to a battery stack including a plurality of battery units that are located in stacked battery modules.

15 Claims, 3 Drawing Sheets

(51) Int. Cl.
   *H01M 50/213*   (2021.01)
   *H01M 50/502*   (2021.01)
   *H01M 50/514*   (2021.01)

(56) References Cited

U.S. PATENT DOCUMENTS

| | | |
|---|---|---|
| 2012/0094157 A1 | 4/2012 | Seto |
| 2013/0012234 A1 | 5/2013 | De Paoli et al. |
| 2013/0122341 A1 | 5/2013 | De Paoli et al. |
| 2015/0118530 A1 | 4/2015 | Lee |

FOREIGN PATENT DOCUMENTS

| | | |
|---|---|---|
| CN | 103038916 A | 4/2013 |
| CN | 102447081 B | 3/2014 |
| CN | 106486634 A | 3/2017 |
| DE | 10 2011 119 253 A1 | 5/2013 |
| DE | 10 2012 110 644 A1 | 5/2014 |
| DE | 10 2015 011 898 A1 | 10/2016 |
| DE | 10 2015 221 269 A1 | 5/2017 |
| EP | 2 410 590 A2 | 1/2012 |
| JP | 2000-138051 A | 5/2000 |
| JP | 2011-216366 A | 10/2011 |
| JP | 2012-084422 A | 4/2012 |
| JP | 2013-532890 A | 8/2013 |
| KR | 10-2012-0038383 A | 4/2012 |
| WO | 2012/013641 A1 | 2/2012 |

OTHER PUBLICATIONS

Korean Office Action from corresponding Korean Patent Application No. 10-2020-7016249 dated Jun. 23, 2023, 10 pages.
Chinese Office Action dated Jan. 20, 2023 from corresponding Chinese Patent Application No. 201880071785.8, 33 pages.
German Office Action from corresponding German Patent Application No. 10 2017 219 934.2 dated Jun. 5, 2023, 9 pages.
Chinese Office Action dated Apr. 26, 2022 from corresponding Chinese Patent Application No. 201880071785.8, 10 pages.
International Search Report dated Feb. 27, 2019 from International Patent Application No. PCT/EP2018/080552, 6 pages.
Written Opinion dated Feb. 27, 2019 from International Patent Application No. PCT/EP2018/080552, 6 pages.
Japanese Office Action dated Nov. 16, 2022 from corresponding Japanese Patent Application No. 2020-526145, 8 pages.

* cited by examiner

MODULE HOUSING FOR A STACKABLE BATTERY MODULE, BATTERY MODULE, AND BATTERY STACK

CROSS REFERENCE TO RELATED APPLICATION

This application claims the benefit under 35. U.S.C. § 119(a) of German Application No. 10 2017 219 934.2 filed on Nov. 9, 2017, and is a national stage application under 35 U.S.C. § 371, of PCT/EP2018/080552, filed on Nov. 8, 2018, the contents of both are incorporated by reference herein in their entirety.

BACKGROUND OF THE DISCLOSURE

1. Field of the Disclosure

The present invention relates to a module housing for a stackable battery module, wherein several battery modules are stackable in a stacking direction to form a battery stack, comprising a base section and a holding space for holding battery units of the battery module. Furthermore, the invention relates to a battery module for a battery stack with a module housing and a battery stack with a plurality of battery units arranged in stacked battery modules.

2. Description of the Related Art

Electrical energy storage systems are widely used in modern technology, for example in electric vehicles. Possible forms of such energy storage systems include lithium-ion batteries. In order to increase the performance of such batteries, it is known to arrange several battery cells as battery units in a battery module and to connect them electrically in parallel to provide a battery level. In order to further increase the electrical performance of such batteries, two or more of these battery modules can be arranged or stacked to form a battery stack, whereby in particular the individual battery units of the battery modules can be connected in a series.

In electric vehicles in particular, such battery stacks can represent a spatially large component. At the same time, such battery stacks can also have a not negligible dead weight. Providing stability to the battery stack and, beyond that, to the entire electric vehicle can therefore be a configuration challenge. According to the state of the art, it is known in particular that external components, for example holding arrangements for the battery stack, bracing and/or stiffening, can be used to ensure the stability of the battery stack itself or also the stability of the battery stack in electric vehicles at all times and in particular in every situation. However, such additional elements usually require additional weight and installation space.

SUMMARY

It is therefore the object of the present invention to at least partially eliminate the disadvantages described above. In particular, it is the object of the present invention to provide, in a cost-effective and simple manner, a module housing for a stackable battery module, a battery module as well as a battery stack, by which a stability of the entire battery stack and preferably even a stability of the entire electric vehicle in which the battery stack is installed is provided or at least improved.

The above object is solved by a module housing for a stackable battery module with the features of the independent claim 1. Furthermore, the object is solved by a battery module for a battery stack with the characteristics of dependent claim 10 and a battery stack with the characteristics of dependent claim 11. Further characteristics and details of the invention result from the dependent claims, the description and the drawings. Features and details described in connection with the module housing according to the invention are of course also valid in connection with the battery module according to the invention as well as the battery stack according to the invention and vice versa, so that with regard to the disclosure of the individual aspects of the invention reference is or can always be made to each other.

According to a first aspect of the invention, the object is solved by a module housing for a stackable battery module, wherein a plurality of battery modules are stackable in a stacking direction to form a battery stack, comprising a base section and a holding space for holding battery units of the battery module. A module housing according to the invention is characterized in that the base section has internal battery receptacles for holding the battery units of the battery module on an inner side of the base facing the holding space and external battery receptacles for receiving force units of a further battery module on an external side of the base facing the holding space.

A module housing according to the invention is intended to provide a housing for a stackable battery module. Stackable in the sense of the invention means in particular that the individual battery modules, the housing of which is provided by a module housing according to the invention, can be arranged on top of each other and stacked to form a battery stack. This can take place in one stacking direction in particular, which means that the battery stack usually has its greatest extent in the stacking direction. Battery units can be arranged in a holding space of the module housing. The holding space is limited by a base section, especially at one end. The base section can, in particular, limit the module housing or its holding space in the stacking direction at the top or alternatively at the bottom.

Essentially, this base section now has internal battery receptacles for accommodating battery units, which are arranged in the holding space of the module housing. To ensure this, the internal battery receptacles are arranged on an inner side of the base section facing the holding space. In particular, the internal battery receptacles are configured in such a way that they can provide a force-transmitting holding for the battery units. Force-transmitting in the sense of the invention may in particular mean that a force can be transmitted from the battery unit to the base section and vice versa from the base section to the battery unit which is arranged in the internal battery receptacle. In addition, on an outer side of the base section, which is located on a side of the base section facing away from the holding space, the base section has external battery receptacles which are also configured to receive battery units. These battery units, which can be arranged in the external battery receptacles, can in particular be arranged in a holding space of a further module housing which is assigned to a battery module which is arranged next in the battery stack. The external battery receptacles are configured, in the same way as the internal battery receptacles, for the power-transmitting reception of these battery units of the other battery module. In other words, a force can also be transferred from the respective battery unit to the base section and from the base section to the battery unit through the external battery receptacles. In other words, a continuous force path from a battery unit of a first battery module via the internal battery receptacles of the module housing of the further battery module to the battery units of this battery module can be provided by the base section, in particular by the internal and external battery receptacles of the base section. In this way, it can be provided, according to the invention, that not only a housing or external elements can provide a power transmission with respect to the battery stack, but that the battery units of the battery stack itself can be used for such a power transmission. In other words, the inherent rigidity of the battery stack can be provided more easily and better by including the battery units in the power transmission, whereby weight and required installation space can be saved, in particular by saving on external stabilization elements. It may even be provided in a particularly preferred way that, if a battery stack with such module housings according to the invention is used in an electric vehicle, a stiffness of the entire electric vehicle can be provided or at least supported by the one, such battery stack.

Furthermore, it may be provided in the module housing according to the invention that the internal battery receptacles and/or the external battery receptacles have contact surfaces for the form-fitting and/or friction-locking and/or force-locking of the respective battery unit. Such contact surfaces make it particularly easy and safe to locate the battery units in the respective internal battery receptacle or external battery receptacle. A particularly good and flexible power transmission from one battery unit via the external battery receptacle to the base section and then from the base section via the internal battery receptacle to another battery unit can be provided in this way.

In accordance with a further development of a module housing according to the invention, it can also be provided that the contact surfaces at least partially have side sections for form-fitting and/or force-locking and/or friction-locking of the respective battery unit, wherein the side sections extend in the direction of the stacking direction. In this way, a further increase in the stability of the entire battery stack with battery module can be provided with module housings according to the invention. The side sections can be configured to be particularly flat, so that even better contact with the respective battery unit and thus even more effective force-transmitting accommodation of the battery units in the respective internal battery receptacle or external battery receptacle can be ensured.

Furthermore, a module housing according to the invention may be further developed in a particularly preferred manner in that the side sections extend along an entire or at least substantially entire circumference of the respective battery unit transversely to the stacking direction. Extensively in the sense of the invention can mean in particular that the side sections, for example in battery units which are at least substantially cylindrical in shape, also nestle against an external side of the respective battery unit in the shape of a cylinder jacket. In this way it is possible to ensure that the battery unit is contacted by the respective side section in any direction transverse to the stacking direction, especially perpendicular to the stacking direction. A tilt protection of the respective battery unit in the battery internal battery receptacle and external battery receptacle can be provided in this way.

A module housing according to the invention may also be configured in such a way that the internal battery receptacles and/or external battery receptacles have adhesive surfaces for an adhesive joint for the materially cohesive attachment of the battery units. Fixing the battery unit in this position can be further enhanced by gluing the respective battery unit in an internal battery receptacle or external battery receptacle. An even better force introduction or transmission between the battery unit and the base section and thus the entire module housing can be further increased in this way.

In addition, a module housing according to the invention may be characterized by the fact that the internal battery receptacles and the external battery receptacles are arranged in pairs in alignment or at least substantially in alignment with each other. In this way it can be provided that the battery units arranged in the internal battery receptacles and external battery receptacles are also arranged in pairs in alignment or at least substantially aligned. An even better power transmission between the battery units via the respective base section of a module housing according to the invention can be enabled in this way. A module housing according to the invention may also be further developed in such a way that the pairs of an internal battery receptacle and an external battery receptacle each have a common contact opening for electrical contacting of the battery units. In particular, it can be provided in this way that an electrical contact between the individual battery units of the pairs of battery units can be made particularly easily. Electrical serial connection of individual battery modules can be performed even more easily in this way.

A module housing in accordance with the invention can also be configured in such a way that a wall section is arranged on the base section, in particular is arranged all around, wherein furthermore an arrangement area for arranging a counter-arrangement area of a further module housing is arranged on an end of the wall section remote from the base section. Such a wall section can be used in particular to delimit the holding space together with the base section. This wall section can also contribute in particular to a transmission of force from a battery module with a module housing in accordance with the invention to another battery module with another module housing in accordance with the invention. However, in comparison to the state of the art, where the wall section often has to provide the entire power transmission, the wall section in a module housing according to the invention can be less stable and thus have a lower weight, since it does not have to transmit the entire power.

According to a further development of a module housing in accordance with the invention, it may also be provided that the arrangement area has an adhesive section for bonding with a counter adhesive section on the counter arrangement area of another module housing. By gluing the individual module housings together in this way, a further increase in power transmission in the entire battery stack can be achieved. An even more stable configuration of a battery stack with battery modules that have module housings according to the invention can be enabled in this way.

According to a second aspect of the invention, the object is solved by a battery module for a battery stack with a module housing. A battery module according to the invention is characterized in that the module housing is configured according to the first aspect of the invention. All advantages which have been described in detail with respect to a module housing according to the first aspect of the invention can thus also be provided by a battery module according to the invention which has such a module housing according to the first aspect of the invention.

According to a third aspect of the invention, the object is solved by a battery stack with a plurality of battery units arranged in stacked battery modules. A battery stack according to the invention is characterized in that the battery modules is formed according to the second aspect of the invention. Battery modules according to the second aspect of the invention have in particular module housings according to the first aspect of the invention. A battery stack according to the third aspect of the invention thus has all the advantages already described in detail with respect to a battery module according to the second aspect of the invention and with respect to a module housing according to the first aspect of the invention.

BRIEF DESCRIPTION OF THE DRAWINGS

Further advantages, features and details of the invention are given in the following description, in which, with reference to the drawings, embodiments of the invention are described in detail. The features mentioned in the claims and in the description may be individually or in any combination substantially inventive. The preceding explanation of the embodiments describes the present invention exclusively in the context of examples. Of course, individual features of the embodiments can be freely combined with each other, if technically reasonable, without leaving the scope of the present invention. Elements with the same function and mode of operation are marked with the same reference signs in the figures. They are schematically shown:

DETAILED DESCRIPTION

Figure 1:
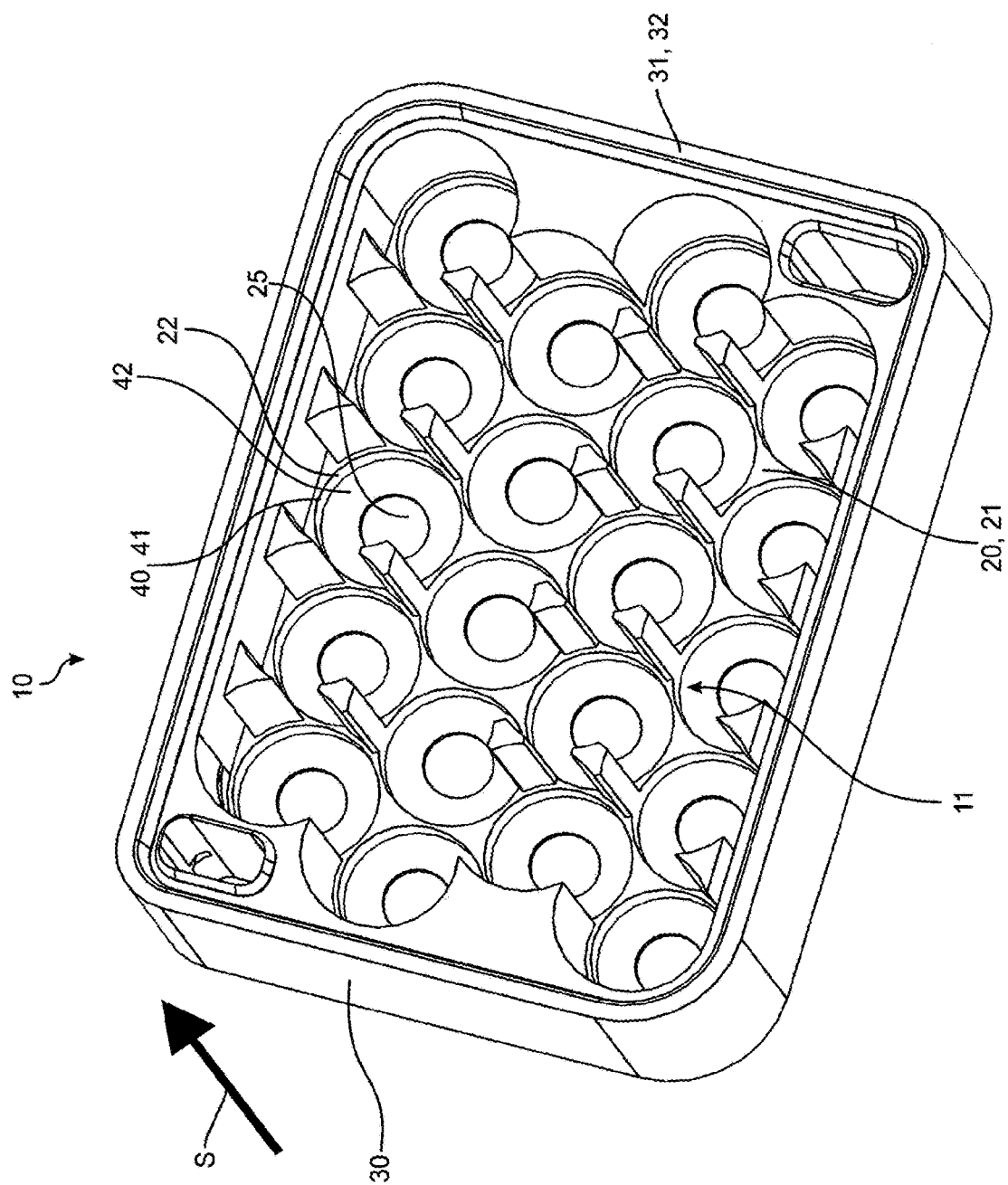
FIG. 1 a module housing according to the invention in a view against a stacking direction.
Figure 2:
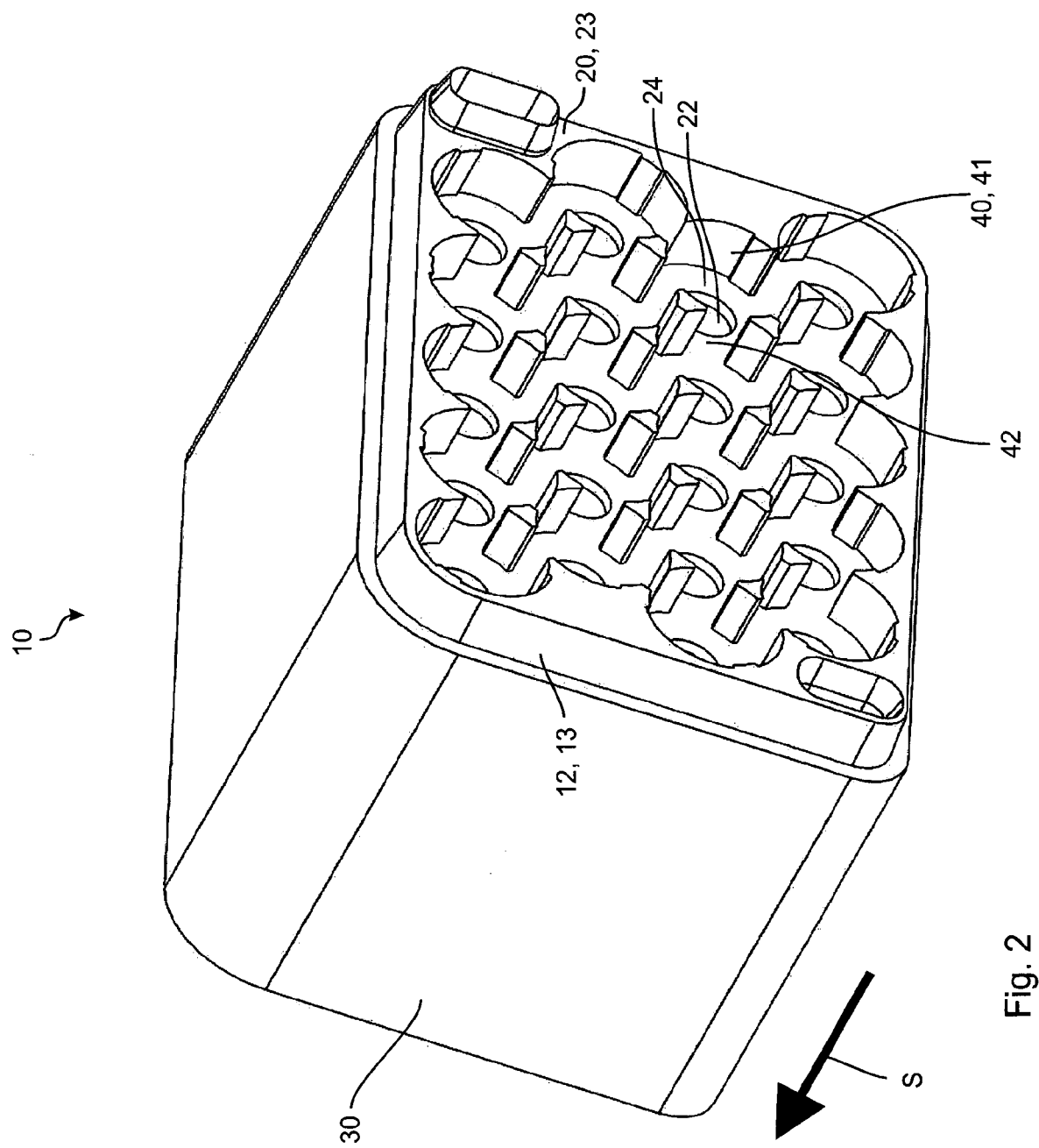
FIG. 2 a module housing according to the invention in a view along a stacking direction.

In FIGS. 1 and 2, a module housing 10 according to the invention is shown in two different views; in FIG. 1 in a view against a stacking direction S, in FIG. 2 in a view in stacking direction S. In the following, both FIGS. 1 and 2 are therefore described together, whereby the details of the two figures are dealt with separately.

FIGS. 1 and 2 show a module housing 10 according to the invention. In particular, a module housing 10 has a base section 20 which, together with a wall section 30, delimits a holding space 11. In the embodiment shown for a module housing 10 according to the invention, the base section 20 is arranged in stacking direction S at the base of the module housing 10. In alternative embodiments of a module housing 10 according to the invention, the base section 20 can also form an upper end of a module housing 10 according to the invention or its holding space 11. Battery units 2 of a battery module 1 (not shown in the picture) can be arranged in holding space 11. To form a battery stack 100 (not shown), battery modules 1, each with a module housing 10 according to the invention, can be stacked on top of each other. For this purpose, the module housings 10 each have an arrangement area 31 on their wall sections 30 which, together with a counter arrangement area 12 of another module housing 10, can provide or ensure the stackability of the battery modules 1. Furthermore, an adhesive area 32 can be arranged on the arrangement area 31 and a counter adhesive section 13 on the counter arrangement area 12, which further simplifies the stacking of the battery modules 1 and, in particular, enables stacking in a stabilized manner.

In essence, the base section 20 of a module housing according to the invention has 21 internal battery receptacles 22 on an inner side of the base and 23 external battery receptacles 24 on an outer side of the base. The internal battery receptacles 22 and the external battery receptacles 24 are each configured for the power-transmitting reception of a battery unit 2. The internal battery receptacles 22 accommodate battery units 2, which are arranged in the holding space 11 of the respective module housing 10. The external battery receptacles 24 are configured in the same way to accommodate battery units 2, which are arranged in another next module housing 10 of a battery module 1 in the battery stack 100. Contact openings 25 can be used to provide an electrically conductive connection between the individual battery units 2. Both the internal battery receptacles 22 and the external battery receptacles 24 each have contact surfaces 40, through which form-fitting and/or force-locking and/or friction-locking of the respective battery unit 2 can be provided. In particular, these contact surfaces may comprise 40 as side sections 41, preferably 2 side sections 41 extending along an entire or at least substantially entire circumference of the respective battery unit transverse to the stacking direction. A particularly good force-transmitting accommodation of the battery units in the respective internal battery receptacle 22 or external battery receptacle 24 and, in particular, the provision of an anti-tilting device for the respective battery unit 2 can be provided in this way. In addition, the internal battery receptacles 22 and the external battery receptacles 24 can have adhesive surfaces 42, through which the respective battery units 2 in the internal battery receptacle 22 and the external battery receptacle 24 can be cohesive and thus be connected with a material bond. An even better force-transmitting accommodation of the battery units 2 in both the internal battery receptacles 22 and the externals battery receptacles 24 can be provided in this way. Furthermore, it is visible that the individual internal battery receptacles 22 and the battery recesses 24 are arranged in pairs in alignment with each other. A pairwise aligned arrangement of the battery units 2, which are arranged in such a pair of internal battery receptacles 22 and external battery receptacles 24, can be provided in this way.

In total, the force-transmitting accommodation of the battery units 2 of the battery module 1 by the battery internal receptacles 22 and the external battery receptacles 24 in a base section 20 of a module housing 10 of the battery module 1 can provide that the battery units 2 can be included in a force transmission. A stiffness of the entire battery stack 100 can thus not only be provided by the wall sections 30 or external elements, but can already be at least partially provided and/or at least supported by the battery units 2 themselves. An entire battery stack 100 can be made more stable in this way and yet have a lower weight.

Figure 3:
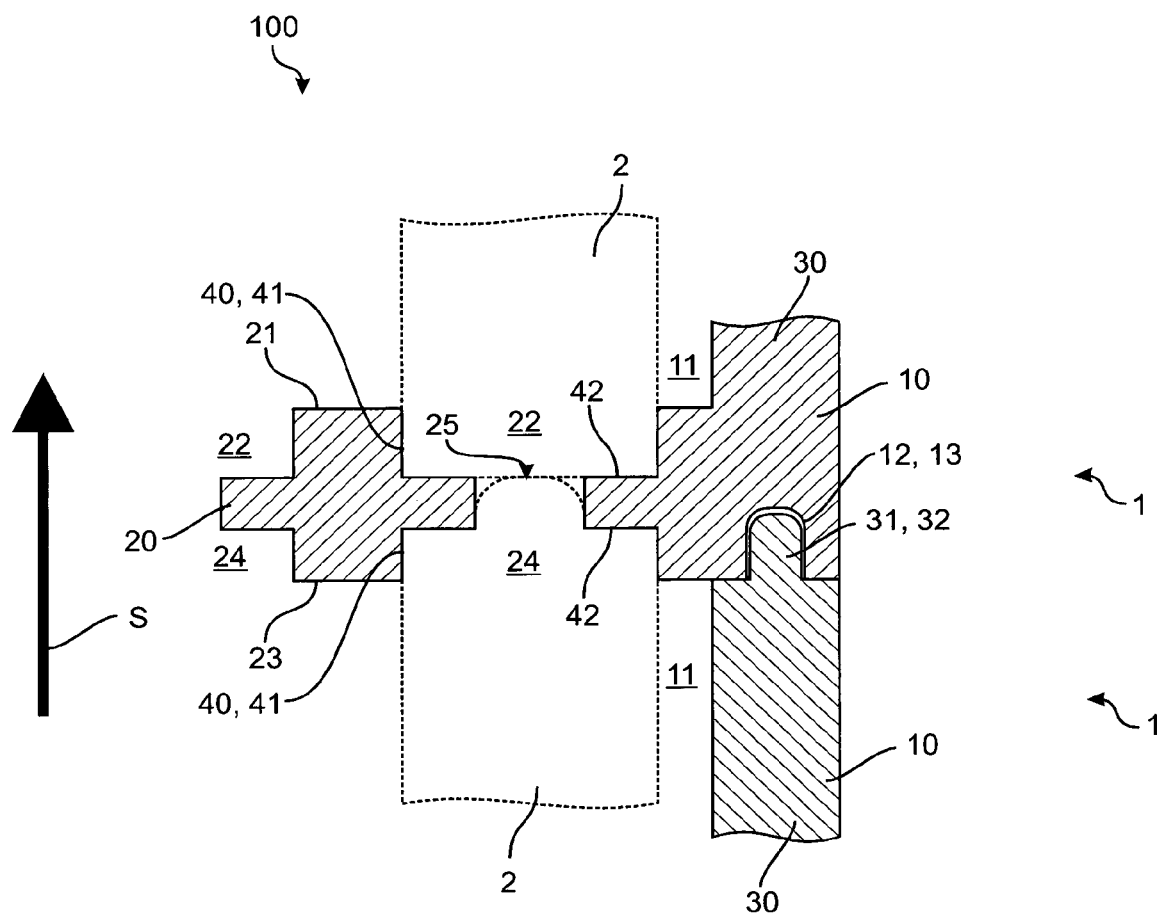
FIG. 3 a section of a battery stack according to the invention.

FIG. 3 now shows a detailed view of a battery stack 100 according to the invention, in particular a connecting area of two battery modules 1 or their module housings 10, which are arranged on top of each other in the stacking direction S. A wall section 30 of the lower module housing 10 and in particular a base section 20 and a part of the wall section 30 of an upper module housing 10 are shown. The two module housings 10 are connected to each other via an arrangement area 31 and a counter arrangement area 12, whereby, in particular, an adhesive section 32 and a counter adhesive section 13 are also provided here for a cohesive connection of the two module housings 10. Furthermore, a pair is shown on an internal battery receptacle 22 and an external battery receptacle 24, each of which contains a battery unit 2. It is clearly visible that electrical contact between the two battery units 2 can be made through the contact opening 25. The contact surfaces 40, in particular the side sections 41 of the contact surfaces 40, are configured for form-fitting and/or force-locking and/or friction-locking of the respective battery unit 2 in the internal battery receptacle 22 and the external battery receptacle 24. In this way, a force-transmitting support for the battery units 2 can be provided in the internal battery receptacle 22 and the external battery receptacle 24. Adhesive surfaces 42 also allow the battery units 2 in the internal battery receptacle 22 and the external battery receptacle 24 to live on their own, and thus in particular to be joined together with a cohesive bond. Altogether, it is also visible that the internal battery receptacle 22 is located on an inner side of the base 21 and the external battery receptacle 24 on an outer side of the base 23. The inner side of the base 21 faces the holding space 11 of the upper module housing 10, the outer side of the base 23 faces the mounting space 11 of the lower module housing 10.

REFERENCE SIGNS 1 battery module
2 battery unit
10 module housing
11 holding space
12 counter arrangement area
13 counter adhesive section
20 base section
21 inner side of the base
22 internal battery receptacle
23 outer side of the base
24 external battery receptacle
25 contact opening
30 wall section
31 arrangement area
32 adhesive section
40 contact surface
41 side section
42 adhesive surface
100 battery stack
S stacking direction

What is claimed is:

1. A module housing for a stackable battery module, in which a plurality of battery modules can be stacked in a stacking direction to form a battery stack, the module housing comprising a base section and a holding space for the accommodation of battery units of the battery module, wherein the base section has internal battery receptacles on an inner side of the base facing the holding space for receiving the battery units of the battery module in a force-transmitting manner and external battery receptacles on an outer side of the base facing away from the holding space for receiving battery units of a further battery module in a force-transmitting manner,
wherein the internal battery receptacles and the external battery receptacles are arranged in pairs in alignment or at least substantially in alignment with one another, wherein the pairs of one internal battery receptacle and one external battery receptacle each have a common contact opening for electrically contacting the battery units, and wherein the module housing causes terminals of the battery units of the battery module and terminals of the battery units of the further battery module to directly connect to each other through the common contact opening.

2. The module housing according to claim 1, wherein at least the internal battery receptacles or the external battery receptacles have contact surfaces for at least one of form-fitting or force-locking or friction-locking of the respective battery unit.

3. The module housing according to claim 2, wherein the contact surfaces at least partially have side sections for at least one of form-fitting or force-locking or friction-locking with the respective battery unit, the side sections extending in the direction of the stacking direction.

4. The module housing according to claim 3, wherein the side sections extend along an entire or at least substantially entire circumference of the respective battery unit transversely to the stacking direction.

5. The module housing according to claim 1, wherein at least the internal battery receptacles or the external battery receptacles have adhesive surfaces for an adhesive joint for a cohesive attachment of the battery units.

6. The module housing according to claim 1, further comprising a wall section that is arranged on the base section, an arrangement area for arranging a counter-arrangement area of a further module housing also being arranged at an end of the wall section remote from the base section.

7. The module housing according to claim 6, wherein the arrangement area has an adhesive section for bonding with a counter adhesive section on the counter arrangement area of the further module housing.

8. A battery module for a battery stack, the battery module having the module housing according to claim 1.

9. A battery stack comprising a plurality of battery units arranged in stacked battery modules, wherein the stacked battery modules each have the module housing according to claim 1.

10. The module housing according to claim 6, wherein the wall section is arranged on the base section circumferentially.

11. The module housing according to claim 2, wherein at least the internal battery receptacles or the external battery receptacles have adhesive surfaces for an adhesive joint for the cohesive attachment of the battery units.

12. The module housing according to claim 3, wherein at least the internal battery receptacles or the external battery receptacles have adhesive surfaces for an adhesive joint for the cohesive attachment of the battery units.

13. The module housing according to claim 4, wherein at least the internal battery receptacles or the external battery receptacles have adhesive surfaces for an adhesive joint for the cohesive attachment of the battery units.

14. The module housing according to claim 5, wherein at least the internal battery receptacles or the external battery receptacles have adhesive surfaces for an adhesive joint for the cohesive attachment of the battery units.

15. The module housing according to claim 1, further comprising a wall section that is arranged on the base section, an arrangement area for arranging a counter-arrangement area of a further module housing also being arranged at an end of the wall section remote from the base section.

* * * * *